(12) United States Patent
Reuschel

(10) Patent No.: US 8,257,224 B2
(45) Date of Patent: Sep. 4, 2012

(54) METHOD FOR CONTROLLING AN INCHING PROCEDURE OF A MOTOR VEHICLE

(75) Inventor: Michael Reuschel, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/365,412

(22) Filed: Feb. 3, 2012

(65) Prior Publication Data

US 2012/0129652 A1   May 24, 2012

Related U.S. Application Data

(63) Continuation of application No. PCT/DE2010/000882, filed on Jul. 26, 2010.

(30) Foreign Application Priority Data

Aug. 3, 2009  (DE) .......................... 10 2009 035 917

(51) Int. Cl.
*F16D 48/06*  (2006.01)
*B60T 11/10*  (2006.01)
*B60W 10/04*  (2006.01)
*B60W 10/18*  (2012.01)

(52) U.S. Cl. .......... 477/73; 477/172; 477/173; 477/181; 477/203

(58) Field of Classification Search ................ 477/72, 477/73, 74, 172, 173, 181, 203
See application file for complete search history.

(56) References Cited

U.S. PATENT DOCUMENTS

| | | | |
|---|---|---|---|
| RE37,572 E * | 3/2002 | Kremmling et al. | 477/74 |
| 6,620,077 B2 * | 9/2003 | Carlson et al. | 477/107 |
| 7,153,235 B2 * | 12/2006 | Takamura et al. | 477/172 |
| 7,484,816 B2 * | 2/2009 | Maruyama et al. | 303/191 |

* cited by examiner

*Primary Examiner* — Edwin A Young
(74) *Attorney, Agent, or Firm* — Lucas & Mercanti, LLP; Klaus P. Stoffel

(57) ABSTRACT

A method for controlling an inching procedure of a motor vehicle, which has at least one friction clutch arranged between a drive unit and a transmission. The torque of the clutch is specified by a control unit and set by a clutch actuator. If the brake and load lever are not actuated, a multi-stage is started by an torque set by the clutch. To perform the process, the torque is increased up to a specified maximum limit to reach a specified speed in a first stage. A specified time period is waited in a second stage if the specified speed does not reached the maximum limit. The torque is increased by a specified value in a third phase if the specified speed is not reached, and the torque is reduced in a fourth stage and a driver warning is output if the specified speed again is not reached.

12 Claims, 1 Drawing Sheet

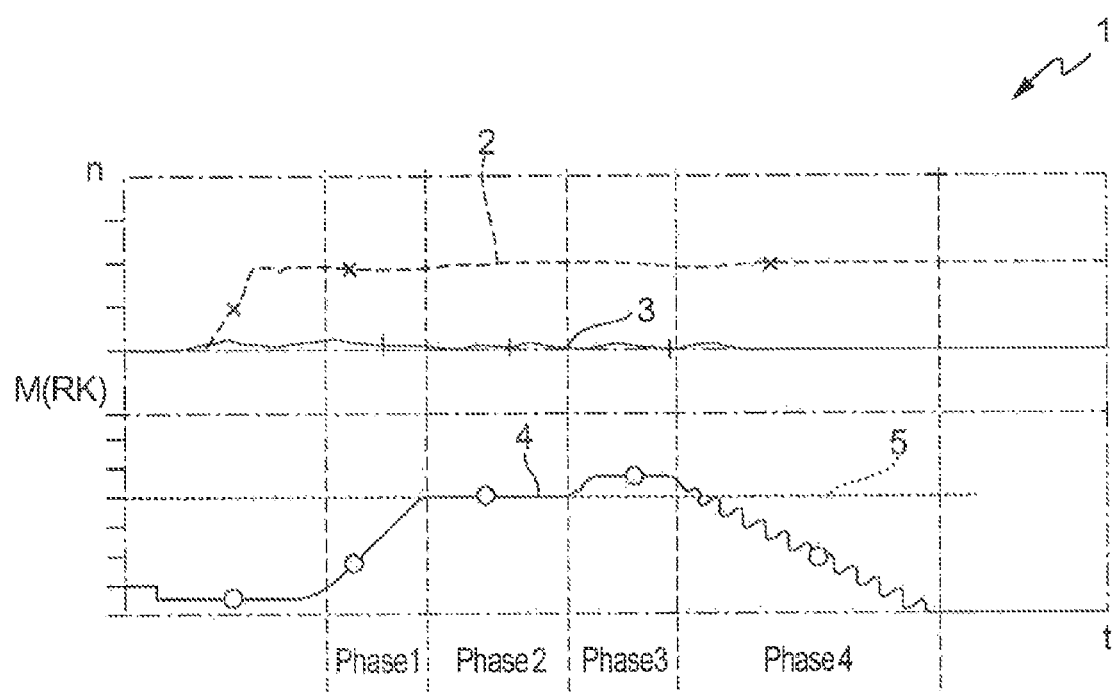

METHOD FOR CONTROLLING AN INCHING PROCEDURE OF A MOTOR VEHICLE

CROSS-REFERENCE TO RELATED APPLICATIONS

This application is a continuation of PCT/DE2010/000882 filed Jul. 26, 2010, which in turn claims the priority of DE 10 2009 035 917.6 filed Aug. 3, 2009. The priority of these applications is hereby claimed and these applications are incorporated by reference herein

FIELD OF THE INVENTION

The invention relates to a method for controlling a creeping maneuver of a motor vehicle.

BACKGROUND OF THE INVENTION

DE 196 39 293 C1 discloses a method for carrying out a creeping process in a motor vehicle. Here, a creeping process is started when a gear stage is engaged, when a load lever is not actuated and when a brake is not actuated by virtue of a high creeping torque being applied in order to obtain a fast starting acceleration and with the creeping torque being decreased after a predefined time. When performing a hill start at a creeping pace, this has the effect that the motor vehicle can roll backward and possibly impact against an obstruction.

Furthermore, methods for controlling a creeping process, in particular for controlling a creeping process with an automatic friction clutch, are known. These methods are intended to protect the friction clutch from overheating when forward movement does not occur by opening the friction clutch so the motor vehicle can roll backward. To prevent backward rolling, the friction clutch can be dosed when starting at a creeping pace does not occur, and to thereby stall the drive unit, such as an internal combustion engine. This can lead to driver irritation because he is not informed of the reason.

SUMMARY OF THE INVENTION

The present invention is therefore related to the creeping process of a motor vehicle and to improve the protection of the friction clutch while avoiding safety-relevant actions.

The present invention is broadly directed to a method for controlling a creeping maneuver of a motor vehicle having at least one automatically actuated friction clutch which is arranged so as to act between a drive unit and a gearbox. The torque transmission capability of which is predefined by means of a control unit and adjusted by a clutch actuator, which has a first sensor device for detecting the speed of the motor vehicle, a second sensor device for detecting an actuation of a service brake of the motor vehicle, and a third sensor device for detecting the actuation of a load lever which controls the drive unit as a function of a driver demand. When the service brake is not actuated and the load lever is not actuated, a multi-stage creeping process is started with a creeping torque set at the friction clutch. The creeping torque is increased in a load-dependent manner, if appropriate, up to a predefined maximum limit value, in order to attain a predefined speed in a first stage. If the predefined speed is not reached at the maximum limit value of the creeping torque, a predefined period of time is allowed to elapse in a second stage. If the predefined speed is not reached, the creeping torque is increased by a predefined value in a third phase, and if the predefined speed is still not reached, the creeping torque is reduced and a warning is output to the driver in a fourth stage. By means of this multi-stage creeping process, the friction clutch is adjusted in a slow and gentle manner into the limit region in which damage does not yet occur, but in the first stages which involve an increase in intensity of the friction clutch in relation to the previous stage, there is a chance of the motor vehicle starting at a creeping pace. The fourth stage serves for warning the driver and for allowing the friction clutch to recover if creeping travel is not possible under these circumstances without subjecting the friction clutch to excessive loading.

In one aspect of the present invention the maximum limit value of the creeping torque can be predefined as a function of the present clutch temperature. In this way, clutch protection is enhanced by virtue of limit values of the creeping torque to be applied for creeping travel, such as a hill start, which is still possible under the conditions to which the friction clutch is subjected, being lower when the friction clutch is hot.

The driver warning may be a visual and/or acoustic signal. A corresponding speech processor, a visual progress indicator or the like may output a plain text message or warning. However, in particular in order to avoid further outlay and to use a driver warning, which the driver intuitively associates with a friction clutch in question, a modulation of the torque can be transmitted via the friction clutch. Such a modulation may be stochastic or regular in form with regard to its modulus, and may, for example, be of sawtooth form or in the form of torque steps. Here, the modulation may be predefined by means of a fixed frequency with continuous reduction of the creeping torque to zero. In special cases, a driver warning may be started already in the third stage.

The fourth stage may be terminated if the driver reacts to the driver warning. The driver can actively intervene in the creeping or starting process by setting a higher driver demand torque by means of the load lever or terminating the creeping maneuver by actuating the parking brake or the service brake. The reaction of the driver may be derived for example, from an actuation of the service brake of the load lever and/or of a selector lever for adjusting the gearbox.

In one embodiment, a motor vehicle which can be braked by means of an automated brake system, for example for an electronic driving stability program (ESP), can in the third stage be braked by the automated brake system by virtue of a braking intervention being initiated. Here, the different control units of the friction clutch and the brake system may communicate with one another by means of a data line, for example CAN bus.

In a further embodiment, the multi-stage creeping process may be adapted to different creeping situations. For example, if the motor vehicle is already rolling and being braked as a result of increasing rolling resistance, the third stage of the creeping process can be skipped.

If the service brake is actuated, the creeping torque is immediately reduced. This may also be the case if a parking brake is actuated. For safety reasons owing to the fact that the parking brake is secured merely by means of one parking brake contact when the parking brake is actuated and the service brake is released, a detection of a released parking brake is not used to initiate the creeping maneuver because the parking brake contact could output an erroneous signal as a result of it being singly secured. The creeping maneuver is therefore started upon the release of a parking brake only in conjunction with a released service brake.

It is self-evident that the method may also be used for a dual clutch gearbox which has two component drivetrains with one friction clutch associated with a component drivetrain. Each of the friction clutches can be operated by means of a corresponding creeping process upon the engagement of a starting gear in the corresponding component drivetrain.

BRIEF DESCRIPTION OF THE DRAWING

The invention will be explained in more detail on the basis of the exemplary embodiment illustrated in the single FIGURE.

The FIGURE shows a diagram of a multi-stage creeping maneuver over time.

DETAILED DESCRIPTION OF THE INVENTION

The FIGURE shows the diagram 1 over the time t. The rotational speed n is plotted against the time t in the upper part of the diagram. The curve 2 with the x markings depicts the rotational speed n(M) of the crankshaft, and the curve 3 shown with the + markings depicts the rotational speed n(GE) of the gearbox input shaft. The lower part of the diagram depicts, in the form of the curve 4 with the o markings, the creeping torque M(RK) transmitted via the friction clutch over the time t.

When the service brake is released and the load pedal not actuated, at the start of phase 1, the internal combustion engine operated with the rotational speed n(M) at idle is connected to the gearbox input shaft via the friction clutch. As a function of the speed which the motor vehicle assumes, a creeping torque M(RK) is generated up to the maximum limit value 5 of the creeping torque M(RK), for example 30 Nm. It can be seen from the curve 3 that, when the creeping torque has been established, the rotational speed n(GE) of the gearbox input shaft does not increase, and the motor vehicle as a result does not start at a creeping pace, for example, because of a steep roadway and/or a heavily loaded trailer. The creeping torque M(RK) is therefore kept at the maximum limit value 5 in phase 2, for example for 3 to 10 seconds. If, as shown by the course of the rotational speed n(GE) in curve 3, the motor vehicle still does not move, then in phase 3, the creeping torque M(RK) is increased by a small magnitude, for example 5 Nm beyond the maximum limit value 5, if the motor vehicle still does not start at a creeping pace, then in phase 4, the creeping torque M(RK) is returned to zero in a modulated manner.

LIST OF REFERENCE NUMERALS

1 Diagram
2 Curve
3 Curve
4 Curve
5 Maximum Limit Value of the Creeping Torque
n Rotational Speed
M(RK) Creeping Torque
t Time

What is claimed:

1. A method for controlling a creeping maneuver of a motor vehicle having at least one automatically actuated friction clutch which is arranged so as to act between a drive unit and a gearbox, the friction clutch having a torque transmission capability that is predefined by a control unit and adjusted by a clutch actuator, the clutch actuator having a first sensor device for detecting the speed of the motor vehicle, a second sensor device for detecting an actuation of a service brake of the motor vehicle, and a third sensor device for detecting an actuation of a load lever which controls the drive unit as a function of a driver demand, the method comprising the steps of:

starting a multi-stage creeping process with a creeping torque set at the friction clutch when the service brake is not actuated and the load lever is not actuated;

increasing the creeping torque in a load-dependent manner up to a predefined maximum limit value in order to attain a predefined speed in a first stage;

allowing a predefined period of time to elapse in a second stage if the predefined speed is not reached at the maximum limit value of the creeping torque;

increasing the creeping torque by a predefined value in a third phase if the predefined speed is not reached; and reducing the creeping torque and outputting a warning to a driver in a fourth stage if the predefined speed is still not reached.

2. The method as claimed in claim 1 wherein the maximum limit value of the creeping torque is predefined as a function of a temperature of the friction clutch.

3. The method as claimed in claim 1, wherein driver warning is realized by a modulation of the torque that can be transmitted via the friction clutch.

4. The method as claimed in claim 3, wherein the modulation takes place in sawtooth form or in a form of torque steps.

5. The method as claimed in claim 3, wherein the modulation takes place at a fixed frequency with continuous reduction of the creeping torque to zero.

6. The method as claimed in claim 1, wherein the fourth stage is terminated by a driver reaction.

7. The method as claimed in claim 6, wherein the driver reaction is an actuation of the service brake, the load lever and/or a selector lever for adjusting the gearbox.

8. The method as claimed in claim 1, wherein a braking intervention initiated by an automated brake system takes place in the third stage.

9. The method as claimed in claim 1, wherein a driver warning is started in the third stage.

10. The method as claimed in claim 1, including skipping the third stage, if the motor vehicle is rolling and being braked as a result of increasing rolling resistance.

11. The method as claimed in claim 1, wherein, if a parking brake is actuated, the creeping torque is reduced.

12. The method as claimed in claim 1, including starting the creeping maneuver upon release of a parking brake only in conjunction with a release of the service brake.

* * * * *